(12) United States Patent
Stothers (10) Patent No.: US 8,602,359 B2
(45) Date of Patent: Dec. 10, 2013

(54) ICE PROTECTION SYSTEM

(75) Inventor: Ian McGregor Stothers, Saham Toney (GB)

(73) Assignee: Ultra Electronics Limited, Greenford (GB)

( * ) Notice: Subject to any disclaimer, the term of this patent is extended or adjusted under 35 U.S.C. 154(b) by 896 days.

(21) Appl. No.: 12/293,405

(22) PCT Filed: Mar. 19, 2007

(86) PCT No.: PCT/GB2007/000966
§ 371 (c)(1),
(2), (4) Date: Jan. 22, 2009

(87) PCT Pub. No.: WO2007/107732
PCT Pub. Date: Sep. 27, 2007

(65) Prior Publication Data
US 2009/0149997 A1    Jun. 11, 2009

Related U.S. Application Data

(60) Provisional application No. 60/784,079, filed on Mar. 17, 2006.

(51) Int. Cl.
*B64D 15/12* (2006.01)
(52) U.S. Cl.
USPC ............................................... 244/134 D
(58) Field of Classification Search
USPC ............... 244/134 R, 134 D, 134 F; 416/39
See application file for complete search history.

(56) References Cited

U.S. PATENT DOCUMENTS

| | | | |
|---|---|---|---|
| 3,440,521 A * | 4/1969 | Kessler | 323/275 |
| 4,036,457 A | 7/1977 | Volkner et al. | |
| 5,206,806 A * | 4/1993 | Gerardi et al. | 340/582 |
| 5,344,696 A * | 9/1994 | Hastings et al. | 428/220 |
| 5,657,951 A | 8/1997 | Giamati | |
| 6,027,078 A * | 2/2000 | Crouch et al. | 244/204 |
| 6,129,314 A * | 10/2000 | Giamati et al. | 244/134 R |
| 6,145,787 A | 11/2000 | Rolls | |
| 6,196,500 B1 * | 3/2001 | Al-Khalil et al. | 244/134 R |

(Continued)

FOREIGN PATENT DOCUMENTS

| | | |
|---|---|---|
| DE | 10 2004 042 423 | 3/2006 |
| EP | 0 680 878 | 11/1995 |
| WO | WO 2006/001830 | 1/2006 |

OTHER PUBLICATIONS

Huang et al., "Efficient Finite Element Method for Aircraft Deicing Problems" Journal of Aircraft, vol. 30, No. 5, pp. 695-704, Sep.-Oct. 1993.

*Primary Examiner* — Joseph W Sanderson
(74) *Attorney, Agent, or Firm* — Dickstein Shapiro LLP (57) ABSTRACT

An ice protection system for a structure having at least one surface to be protected from a range of icing conditions. The ice protection system includes at least one heater device, arranged in thermal contact with at least one surface to be protected; at least one temperature sensor for outputting at least one temperature signal, the sensor being in thermal contact with the heater device; and a control system for controlling the heat output of the heater device using the temperature signal. The control system is operable to control the heat output of the heater device in order to maintain the temperature of the heater device at a substantially constant temperature.

27 Claims, 8 Drawing Sheets

(56) References Cited

U.S. PATENT DOCUMENTS

| | | |
|---|---|---|
| 6,283,411 B1 | 9/2001 | Giamati et al. |
| 6,330,986 B1 | 12/2001 | Rutherford et al. |
| 6,338,455 B1 | 1/2002 | Rauch et al. |
| 6,370,450 B1 * | 4/2002 | Kromer et al. ............... 701/14 |
| 6,753,513 B2 | 6/2004 | Goldberg et al. |
| 6,906,537 B2 * | 6/2005 | Goldberg et al. ............ 324/721 |
| 6,913,571 B2 | 7/2005 | Severns |
| 7,246,773 B2 * | 7/2007 | Stoner et al. .............. 244/134 D |
| 7,523,889 B2 * | 4/2009 | Bourjac et al. ............ 244/134 D |
| 7,784,739 B2 * | 8/2010 | Nichols ...................... 244/134 F |
| 2003/0039298 A1 | 2/2003 | Eriksson et al. |
| 2005/0263646 A1 * | 12/2005 | Nichols ...................... 244/134 F |
| 2007/0075188 A1 * | 4/2007 | Stoner et al. .............. 244/134 D |
| 2007/0295712 A1 * | 12/2007 | Forman et al. ................ 219/492 |

* cited by examiner

Fig. 1

HEATER ZONE

NOMINAL POWER OF ANTI-ICING HEATER ZONES

Fig. 11

POWER RATIO OF ANTI-ICING HEATER ZONES

ICE PROTECTION SYSTEM

This application claims the benefit of U.S. Provisional Application No. 60/784,079, filed on Mar. 17, 2006.

The present invention relates to an ice protection system, an ice protection control system and a method of protecting at least one surface of a structure from a range of icing conditions.

Ice protection systems protect against the build-up of ice on structures. One common application of ice protection systems is on aircraft. During flight, the surfaces of an aircraft can be exposed to water vapour at low temperatures and, if no preventative action is taken, ice can quickly form on the wings, on control surfaces, and on other parts of the aircraft in such a way as to alter the aerodynamic performance of the aircraft (for example by altering the airflow around the aircraft and by adding additional weight to it) with potentially catastrophic consequences.

Electrothermal ice protection systems comprise a large number of heater devices (such as heater mats), which can be used as anti-icing zones in which a sufficient temperature is maintained at the surface of the wing in order to prevent the formation of ice on and behind the protected zone. These heater devices can also be used as de-icing zones to shed ice that has been allowed to accrete on the protected region. The de-icing mats are cyclically energised in order to melt the interface between the wing and the accreted ice, causing the ice to be shed.

In such an ice protection system it is important to avoid overheating of the heater devices (heating mats) in order to avoid a failure either of the devices or in the structure to which the devices are attached. Many modern aircraft (and other structures) use composite materials, which can suffer damage (delamination of the material, for example) at a relatively low temperature. Temperature 'overshoot' of the heater devices must therefore be controlled whilst maintaining rapid heating of the protected surface(s).

Aircraft are normally subject to a range of different icing conditions during flight, such as different air temperatures, air velocities, relative humidity, and so on, which can depend for example on the location, altitude, orientation, air speed or pitch of the aircraft, the prevailing meteorological conditions, and so on. Different icing conditions can determine not only the temperatures and velocities (and so on) at which ice will form on different parts of the aircraft structure, but also the heat loss from the aircraft structure.

One approach to avoiding the temperature overshoot problem is to provide a temperature sensor in the area of composite material between the heater mat and the erosion shield (the erosion-resistant outer layer), and to switch off the heater mat when the measured temperature exceeds a predetermined threshold temperature (which is smaller than the delamination temperature by a predetermined safety margin). The heater mat can be switched back on again when the temperature drops below a certain threshold, for example. As a result, temperature overshoots can be reduced, but the temperature of the surface of the aircraft can repeatedly fluctuate as the heater mat is periodically switched on and off. Additionally, the temperature measurement can lag behind the heater mat output because of thermal capacity between the temperature sensor and heater mat. Moving the temperature sensor closer to the mat can reduce the thermal capacity (and hence lag) but may also move the sensor out of the region (the composite material) in which the temperature is desired to be controlled.

In order to address the variable heat flow out of the exposed aircraft surfaces as a result of variations of icing conditions, one approach is to measure the outside air temperature (OAT) of the aircraft (because the amount of heat loss from the structure is highly related to the OAT), and to use a feedforward control scheme to vary the power applied to the heater mats in dependence on the measured OAT. There are many other factors controlling the heat flow and ice formation, however, and these factors need to be accounted for in order to improve the feedforward control scheme. Liquid water content (LWC) is another important factor, for example, and can be relatively difficult to measure accurately during flight.

In consideration of these issues, a first aspect of the invention provides an ice protection system for a structure having at least one surface to be protected from a range of icing conditions, the ice protection system comprising: at least one heater device, arranged in thermal contact with said at least one surface; at least one temperature sensor for outputting at least one temperature signal, said at least one sensor being in thermal contact with at least one said heater device; and a control system for controlling the heat output of said at least one heater device using said at least one temperature signal, wherein the control system is operable to control the heat output of said at least one heater device in order to maintain the temperature of said at least one heater device at a substantially constant temperature. Each heater device may have a respective substantially constant temperature (not all heater devices may have the same temperature, as mentioned below). The heater device temperature may be constant within 0.5° C., 1° C., 2° C., or 5° C., and/or may vary by less than 10%, 5%, 2%, 1% or 0.5%, but may of course vary more than this with transient effects arising from the control system and/or heater devices being switched on or off and being powered up and powered down.

It was found that attempting to maintain the heater devices at a substantially constant temperature provided a more stable control system than (for example) attempting to maintain a constant surface temperature, because the heater mat temperature is normally subject to smaller perturbations due to external influences (such as changes in OAT, LWC, and so on) than the surface. In comparison to on/off switching systems, the risk of overshoot and of fatigue due to the constant cycling of temperature can also be reduced.

The control system may furthermore be operable to maintain the temperature of said at least one heater device at the substantially constant temperature throughout the range of icing conditions, and may do so throughout substantially all icing conditions to which said at least one surface is expected to be subjected during use. In particular, in one embodiment in which the ice protection system is used for an aircraft, said at least one substantially constant temperature may be sufficient to prevent ice accumulation on said at least one surface during the most extreme icing conditions to which the aircraft is expected to be subjected. This can simplify the control system because it does not need to continuously adapt the control scheme in response to external stimuli. It can also lead to more predictable power consumption, which can simplify the design of the power supply in the structure.

The control system may be operable to maintain the temperature of each heater device at a respective substantially constant temperature in order to enable different heater devices to operate at different temperatures. The control system may maintain a separate (not necessarily distinct) constant temperature for each heater device, or may control the temperature of groups of heater devices, for example.

In addition to controlling the temperature of the heater devices, the control system may be operable to control the heat output of said at least one heater device to maintain a temperature at said at least one surface at or above a minimum temperature. In particular, the control system may be operable to maintain the temperature at said at least one surface at the desired level throughout the range of icing conditions (which may be substantially all icing conditions to which said at least one surface is expected to be subjected during use). In this case, the control system may be operable to maintain the temperature at said at least one surface above a temperature at which ice will form on the surface. The control system may also be operable to maintain the temperature of said at least one heater device at the desired level substantially irrespective of the temperature at said at least one surface.

A first thermal resistance between said at least one temperature sensor and said at least one heater device may be smaller than a second thermal resistance between said at least one temperature sensor and said at least one surface to be protected. The smaller the thermal resistance between the temperature sensor(s) and the heater device(s), the more accurate the temperature sensor will be as a measurement of the heater mat temperature.

Also, a first thermal capacity between said at least one temperature sensor and said at least one heater device may be smaller than a second thermal capacity between said at least one surface and said at least one heater device to be protected. The control loop can be relatively responsive if the thermal capacity between the temperature sensor(s) and the heater device(s) is small relative to the thermal capacity between the heater device(s) and the surface(s). Otherwise if the thermal loading on the surface is rapidly reduced, the heater device(s) can overheat before the control loop has a chance to adapt.

In one embodiment, said at least one heater device is arranged between said at least one temperature sensor and said at least one surface to be protected. In particular, said at least one heater device may be arranged to dissipate heat in one direction through said at least one surface and may be arranged to dissipate heat in another direction through at least one heat sink (such as the body of the structure), said at least one temperature sensor may be arranged between said at least one heater device and said at least one heat sink, and the ice protection system may be arranged such that a first thermal resistance between said at least one heater device and said at least one heat sink is smaller than a second thermal resistance between said at least one heater device and said at least one surface. By essentially placing the temperature sensor(s) behind the heater device(s), relative to the surface(s), more reliable control and easier sensor placement can be achieved, because the thermal gradient behind the heater device is normally much shallower than the thermal gradient in front of the heater device (because the heat losses from the external surface are much greater than the heat losses from the internal surface). If the sensor is placed in front of the heater device, however, a small misalignment or movement of the sensors depth can result in a large temperature variation due to the steep temperature gradient.

At least one temperature sensor may be separated from said at least one heater device by a layer of thermal insulation (which may also act as a dielectric). This can reduce 'hot spot' effects, for example.

Said at least one temperature sensor may be operable to provide an averaged temperature reading. For example, said at least one temperature sensor may comprise at least one point temperature sensor and at least one high thermal conductivity strip (such as a copper strip, for example) to which said at least one point temperature sensor is attached. Alternatively (or additionally), said at least one temperature sensor may comprise at least one distributed or long resistive temperature sensor. These features can help to reduce the effect of variations in thermal loading (such as the movement of a stagnation zone on an aircraft wing, for example, due to changes in angle of attack, speed, and the like).

The at least one heater device may include at least one anti-icing strip. The anti-icing strip(s) may be continuously powered and controlled as mentioned above, preventing any ice formation on the zone.

The at least one heater device may also include at least one ice breaker strip. The ice breaker strip may be intermittently 'cycled' or pulsed with power, in order to break off, but not entirely melt, any accumulated ice (for example). On an aircraft, ice breaker strips may be placed behind anti-icing strips in order periodically to shed ice that forms as a result of 'run-back' water flowing from the anti-icing strips. In particular, the control system maybe operable to switch said at least one ice breaker strip on and off in accordance with a de-icing schedule. The control system may be operable to apply the constant temperature control scheme at times when the ice breaker strip is energised (but not otherwise).

The ice protection system may further comprise at least one power controller operable to supply variable amounts (such as substantially continuously variable amounts, for example) of power to said at least one heater device in dependence on control signals received from the control system.

The control system may also be operable to receive a signal indicative of a demand heater device temperature, and to maintain the temperature of said at least one heater device in dependence on the demand heater device temperature. The demand temperature can vary over time. For example, the demand temperature may be selected in dependence on the prevailing icing conditions.

The control system may be operable to determine a target heat output for each heater device, and to control said at least one heater device using the target heat output. The target output may be measured in terms of energy or power, for example.

In one embodiment, said at least one heater device includes at least one heater device having an associated temperature sensor and at least one heater device not having an associated temperature sensor; and the control system is operable to determine the target heat output for said at least one heater device not having an associated temperature sensor as a function of the target heat output of a heater device having an associated temperature sensor. Each function can be defined in terms of various parameters but may also be a constant. A different function can be provided for each heater device. This can allow certain heater devices to be 'slaved' to others, reducing the number of temperature sensors and control loops that are required.

The control system may include at least one proportional feedback controller for controlling the heat output of each heater device using said at least one temperature signal. The proportional controller may use any appropriate combination of proportional, integral and derivative (PID) control, but in one embodiment only proportional and integral (PI) control is used. Other feedback control schemes are of course possible. The heat output may be controlled only in part by the feedback controller. For example, the control system may also (or alternatively) include at least one feedforward controller for controlling the heat output of each heater device using at least one signal indicative of the icing conditions. The signal may be a measurement of OAT, LWC, and so on.

In one embodiment the control system includes a processing unit for outputting at least one estimate of the temperature at said at least one surface, the processing unit calculating said at least one estimate of the temperature using at least one estimate of the heat output by said at least one heater device, said at least one temperature signal, and at least one estimate of the thermal resistance between said at least one heater device and said at least one surface, and the control system is operable to control the heater devices using said at least one estimate of the temperature at said at least one surface.

In another aspect of the invention there is provided an ice protection control system for use with a structure having at least one surface to be protected from a range of icing conditions and including at least one heater device, arranged in thermal contact with said at least one surface, and at least one temperature sensor for outputting at least one temperature signal, said at least one sensor being in thermal contact with at least one said heater device, wherein the ice protection control system comprises: a first interface for receiving said at least one temperature signal from said at least one temperature sensor; a second interface for outputting power control signals for controlling said at least one heater device; and a controller for generating the power control signals to control the heat output of said at least one heater device using said at least one temperature signal, in order to maintain the temperature of the or each heater device at a substantially constant temperature.

Another aspect of the invention provides an ice protection system as aforesaid, including an ice protection control system as aforesaid.

The invention also provides an aircraft including an ice protection system as aforesaid.

In a further aspect of the invention there is provided a method of protecting at least one surface of a structure from a range of icing conditions, the structure including at least one heater device in thermal contact with said at least one surface, and the method comprising: receiving at least one temperature signal from at least one temperature sensor in thermal contact with at least one said heater device; controlling the heat output of said at least one heater device using said at least one temperature signal, wherein the step of controlling the heat output of said at least one heater device includes controlling the heat output of said at least one heater device in order to maintain the temperature of the or each heater device at a substantially constant temperature.

In another aspect of the invention there is provided a method of installing an ice protection system for a structure having at least one surface to be protected from a range of icing conditions, the method comprising: arranging at least one heater device in thermal contact with said at least one surface; arranging at least one temperature sensor in thermal contact with at least one said heater device, said at least one temperature sensor being operable to output at least one temperature signal; and installing a control system for controlling the heat output of said at least one heater device using said at least one temperature signal, the control system being operable to control the heat output of said at least one heater device in order to maintain the temperature of said at least one heater device at a substantially constant temperature.

In a yet further aspect of the invention there is provided a method of installing an ice protection control system for use with a structure having at least one surface to be protected from a range of icing conditions and including at least one heater device, arranged in thermal contact with said at least one surface, and at least one temperature sensor for outputting at least one temperature signal, said at least one sensor being in thermal contact with at least one said heater device, wherein the method comprises: connecting a first interface of the control system to said at least one temperature sensor, the first interface being operable to receive temperature signals from said at least one temperature sensor; connecting a second interface of the control system, said second interface being operable to output power control signals for controlling said at least one heater device; and installing a controller for generating the power control signals to control the heat output of said at least one heater device using said at least one temperature signal, in order to maintain the temperature of the or each heater device at a substantially constant temperature.

In another aspect of the invention there is provided a structure exposable to icing conditions, comprising: at least one member having at least one surface to be protected from a range of icing conditions; and an ice protection system as aforesaid. Said at least one heater device may be arranged in a position in said member away from said at least one surface. Also, if said at least one member includes at least one leading edge, said at least one heater device may be arranged away from but in thermal contact with said at least one leading edge. The structure may include laminate material.

The present invention can be implemented in any convenient form, for example using dedicated hardware, or a mixture of dedicated hardware and software. The invention may further comprise a data network (for example to enable communications between the control system and other parts of the structure), which can include any local area network or other appropriate network. Aspects of the present invention encompass computer software implementable on a programmable device. The computer software can be provided to the programmable device using any conventional carrier medium. The carrier medium can comprise a transient carrier medium such as an electrical, optical, microwave, acoustic or radio frequency signal carrying the computer code. An example of such a transient medium is a TCP/IP signal carrying computer code over an IP network, such as the Internet. The carrier medium can also comprise a storage medium for storing processor readable code such as a floppy disk, hard disk, CD ROM, magnetic tape device or solid-state memory device.

Although each aspect and various features of the present invention have been defined hereinabove independently, it will be appreciated that, where appropriate, each aspect can be used in any combination with any other aspect(s) or features of the invention. In particular, features disclosed in relation to apparatus aspects may be provided in appropriate form in relation to method aspects, and vice versa.

Embodiments of the present invention will now be described with reference to the accompanying drawings, in which.

Figure 1:
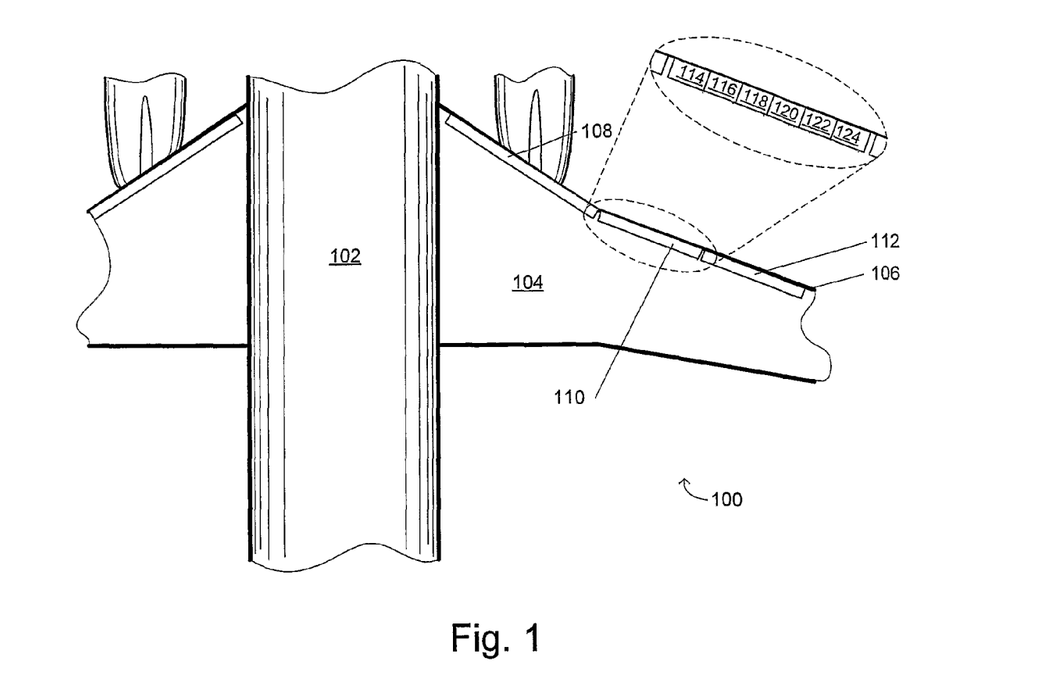
FIG. 1 is an illustration of the placement of heater mats and heater zones of an ice protection system of an aircraft.

FIG. 1 is an illustration of a portion of an aircraft, showing the placement of heater mats and heater zones of an ice protection system of an aircraft. The aircraft 100 includes a fuselage portion 102 and a wing portion 104. On the leading edge 106 of the wing 104 are provided a plurality of heating mats 108, 110, 112 and others (not shown).

Each heater mat is divided into a number of heater zones. The number and size of the heater zones are chosen to suit a particular safety model, for example such that up to two heater zones can fail without causing a hazardous or catastrophic failure of the aircraft. In one aircraft design, safety requirements require each heater mat 110 to be divided into six separate heater zones 114, 116, 118, 120, 122, 124.

Figure 2:
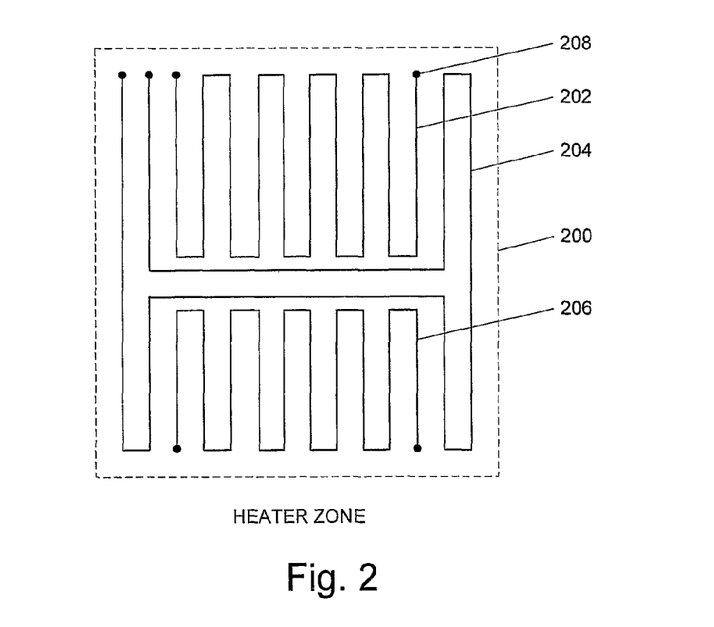
FIG. 2 is a schematic showing the placement of heater elements within a heater zone.

FIG. 2 shows the structure of a heater zone. The heater zone 200 comprises an upper de-icing element 202, a central anti-icing element 204, and a lower de-icing element 206. The elements take the form of resistance heater material arranged in a serpentine configuration and embedded within the heater mat. The elements are provided with contacts 208 to allow power to be applied to the element.

In accordance with known de-icing techniques, the de-icing system maintains the anti-icing element 204 at a temperature sufficient to prevent ice forming above the element, and intermittently cycles power to the de-icing elements 202, 206 to shed any ice formed above them by run-back water from the anti-icing zone, for example.

Figure 3:
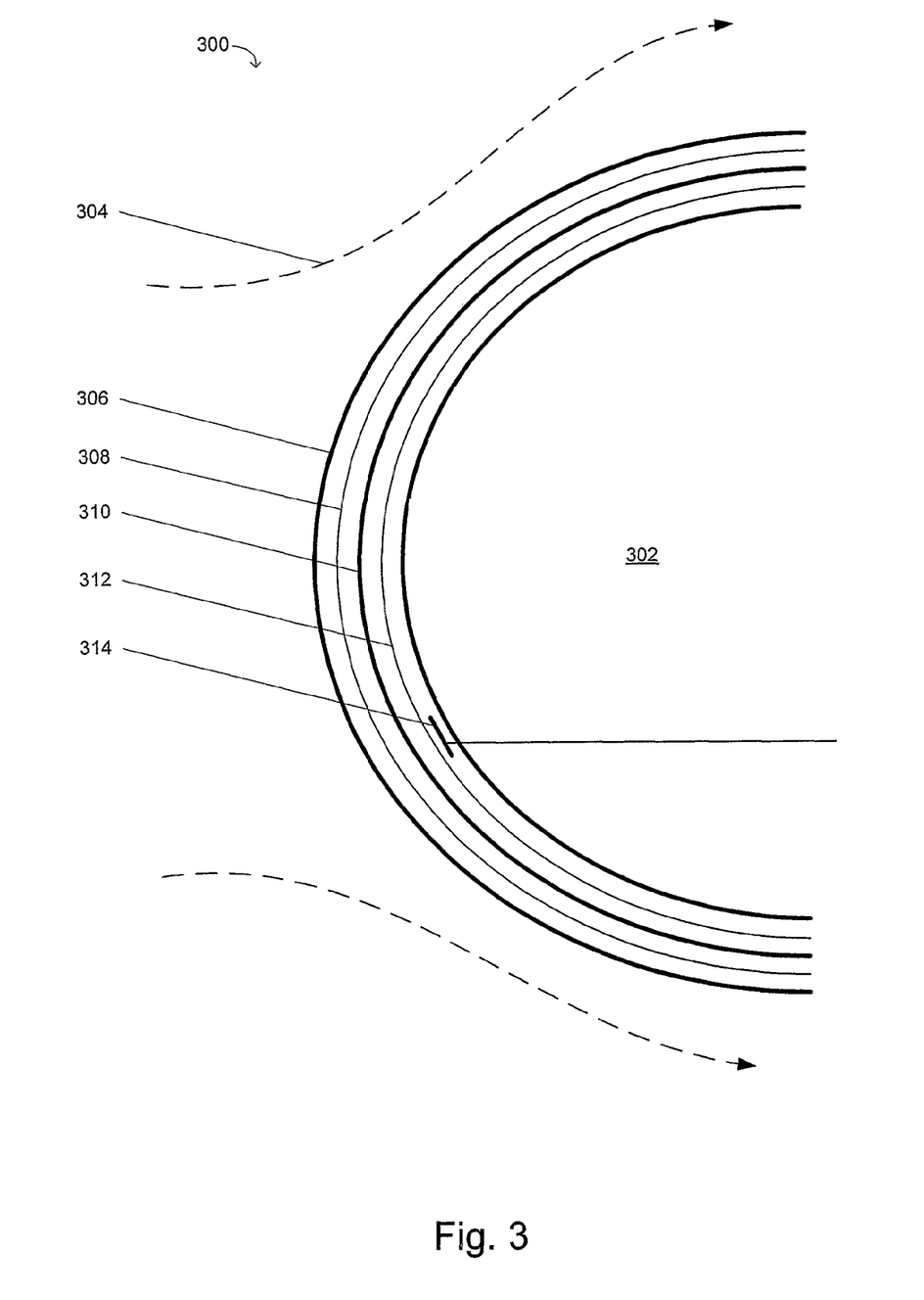
FIG. 3 is a cross-section of the structure of an aircraft wing section.

FIG. 3 is a cross-section 300 of the structure of an aircraft wing section. The figure shows the leading edge 302 of the wing in cross-section and an approximation of the airflow 304 over the wing whilst in flight. The wing includes an erosion shield 306, typically a stiff, erosion-resistant aluminium shield, a dielectric (insulator) 308, a heater mat 310, another dielectric 312, and a temperature probe 314. The layers 306, 308, 310, 312 are much thinner than as shown, forming a thin sandwich at the edge of the wing section.

The main wing section 302 is formed from any appropriate material, such as composite materials that comprise a plurality of layers of stiff material bound together with glue. Composite materials have a good ratio of strength to weight, but are susceptible to failure by delamination (when the glue melts) at a relatively low temperature. Therefore care needs to be taken to avoid 'overshoot' (overheating) of the heater mat.

It will be appreciated that a similar arrangement may be provided on other exposed parts of the aircraft structure (such as on propeller leading edges or on engine inlets, for example).

Figure 4:
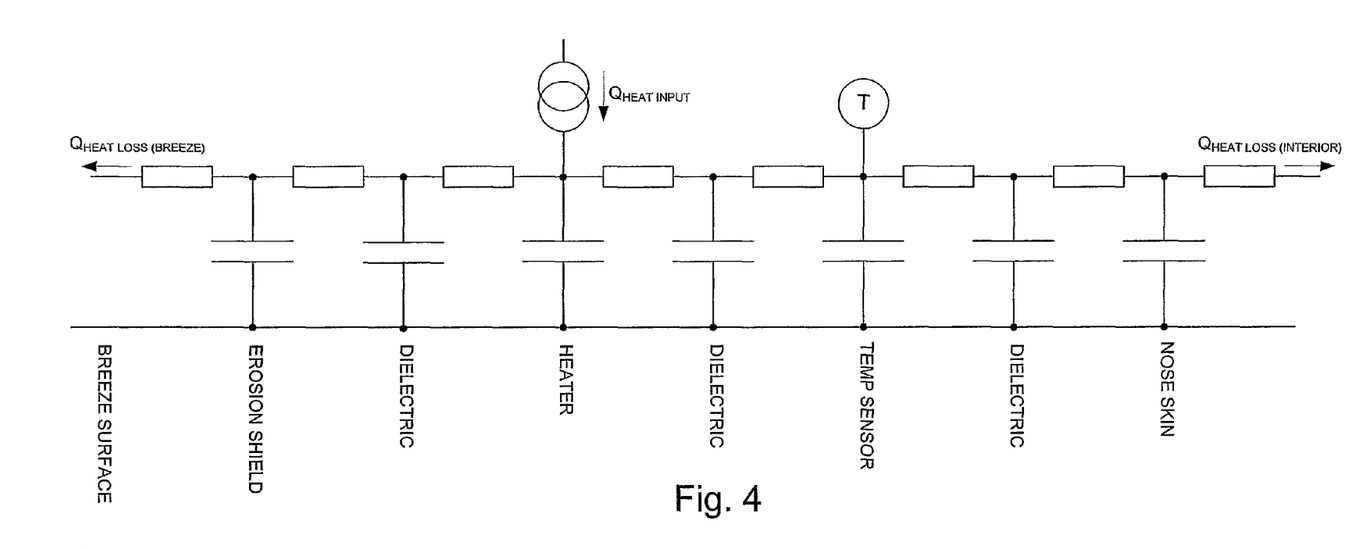
FIG. 4 is an illustration of thermal resistances and thermal capacitances of the wing section of FIG. 3.

FIG. 4 is an illustration of thermal resistances and thermal capacitances of the wing section of FIG. 3.

The thermal resistances (degree of thermal insulation) and thermal capacitances (heat capacity) are illustrated using electrical equivalents, with heat flow corresponding to electrical current and temperatures corresponding to voltages. In this representation, the heat generated by the heater mat is represented by a current source $Q_{HEAT\,INPUT}$ and the temperature sensor 314 of FIG. 3 is represented as a voltage measurement. Each of the layers has an associated thermal capacity (which may be negligible) and the thermal resistance of each layer is also shown. The heat loss at the breeze surface (the interface with the air impinging on the wing), $Q_{HEAT\,LOSS\,(BREZE)}$, and the heat loss into the interior of the wing, $Q_{HEAT\,LOSS\,(INTERIOR)}$, are also indicated (as currents flowing out of the thermal circuit). The heat loss $Q_{HEAT\,LOSS\,(INTERIOR)}$ into the interior of the structure is considerably less than the heat loss $Q_{HEAT\,LOSS\,(BREZE)}$ through the erosion shield (by design).

The thermal properties of the wing section during normal ice protection conditions (during flight) will now be described in more detail.

Figure 5:
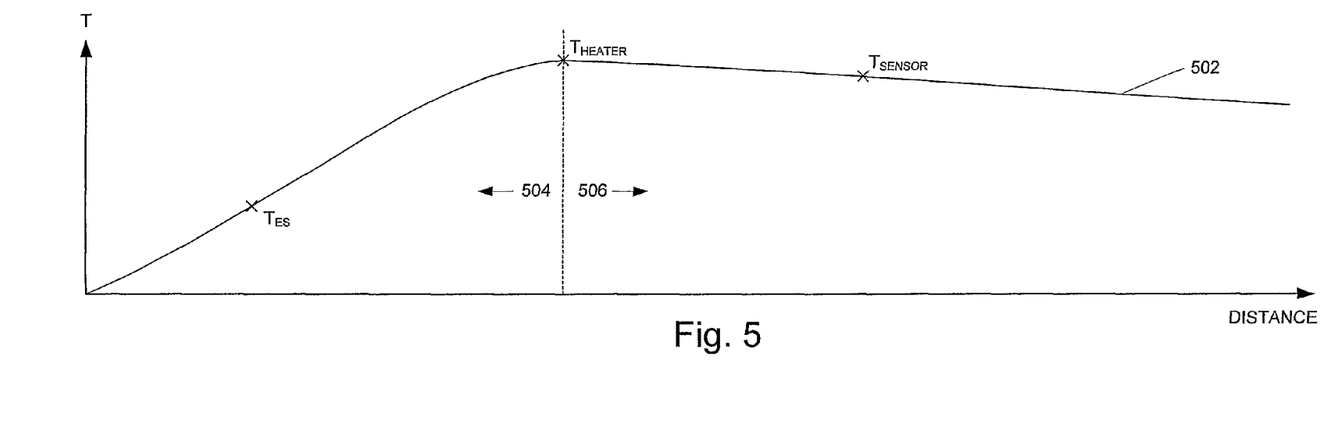
FIG. 5 is a graph illustrating the variation of temperature over distance within the wing section of FIG. 3.

FIG. 5 is a graph illustrating the variation of temperature over distance within the wing section of FIG. 3. The temperature 502 is plotted from the left hand side 504, where large amounts of heat flow through the erosion shield, to the right hand side 506, where heat is slowly lost into the wing structure. The gradient of the curve 502 is equivalent to the thermal gradient (although not drawn to scale).

The heater temperature $T_{HEATER}$, the temperature sensor temperature $T_{SENSOR}$ and the erosion shield temperature $T_{ES}$ are indicated on the temperature curve 502. The temperature sensor temperature $T_{SENSOR}$ is approximately equal to the heater mat temperature $T_{HEATER}$ because of the shallow thermal gradient flowing into the structure 506. The erosion shield temperature $T_{ES}$ is quite different, however, because of the steep temperature gradient flowing out of the wing 504. In accordance with the electrical analogy in FIG. 4, the temperature T is substitutable for a voltage, and a corresponding current can be derived from the gradient of the curve 502.

Figure 6:
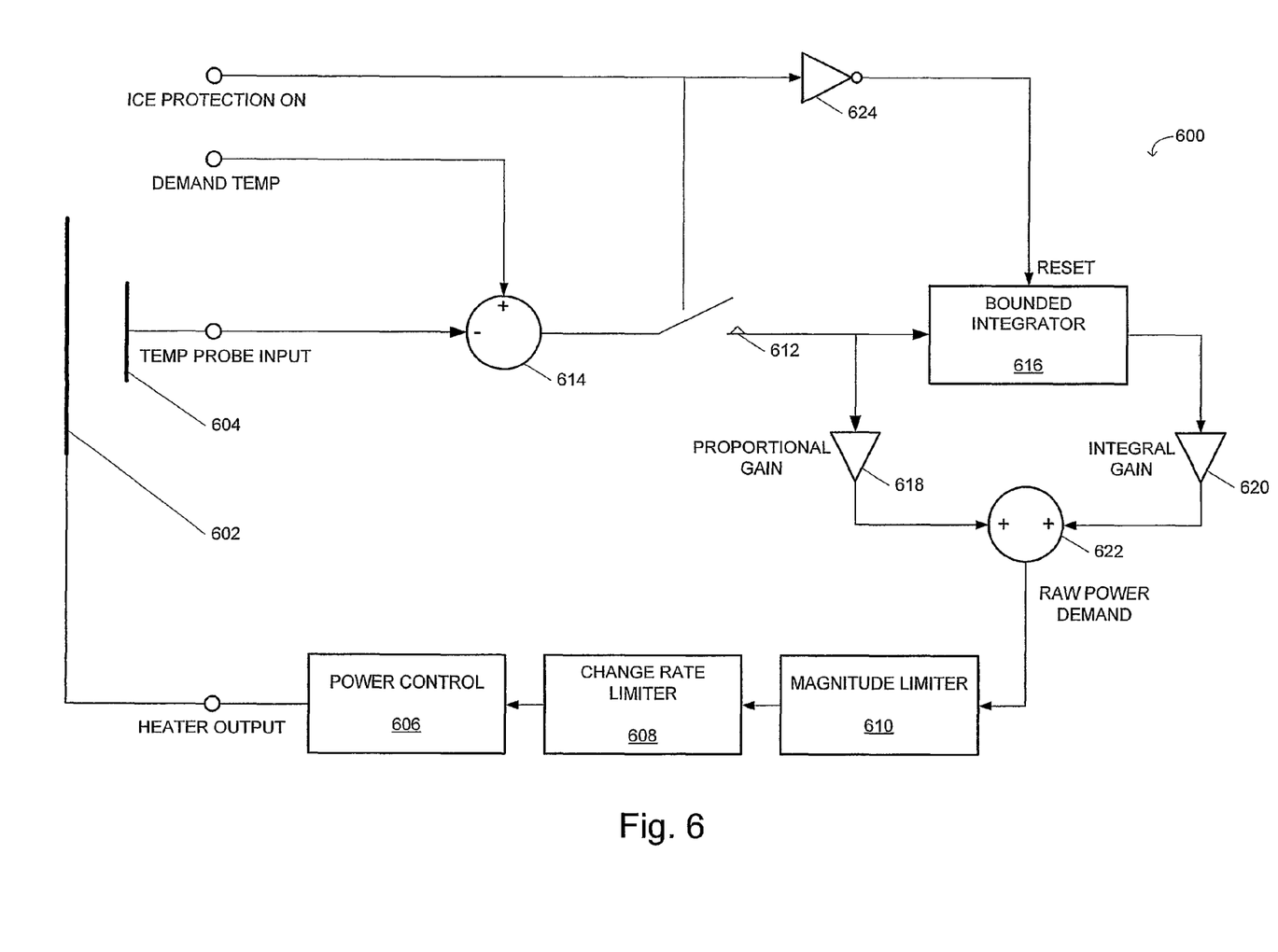
FIG. 6 is a schematic of a temperature control system for use with the ice protection system of FIG. 1.

FIG. 6 is a schematic of a temperature control system for use with the ice protection system of FIG. 1.

The control system 600 provides a heater output to a heater mat 602, and receives an input from the temperature probe 604, arranged proximate the heater mat as described above. The heater mat 602 is driven by a power control unit 606, which includes the appropriate power amplifiers and so on. The power control unit 606 is fed via a change rate limiter 608 and a magnitude limiter 610 that condition the power demand in order to avoid placing undue strain on the generator of the aircraft (or other structure, as applicable).

The temperature of the surface to be protected can be calculated from knowledge of the heater mat thermal resistance and the thermal flux from the heater element (which can be derived from the power supplied to the heater element). The mat temperature is controlled through control of the power supplied to the mat.

The power may either be controlled on the basis of the temperature sensor 604, directly, or through the derived surface temperature. As the derived surface temperature is dependent on power, in addition to the temperature sensor value, it may be less stable in control. For this reason in the present embodiment it is chosen to control power on the basis of the output of the temperature sensor 604 at the rear of the mat.

When the ice protection system is switched on (via the 'ice protection on' input), the switch 612 closes to form the control loop. The temperature probe input is subtracted from the input demand temperature by the processing unit 614 to determine an error signal. The error signal is then fed into a bounded integrator 616 and a proportional gain unit k 618. The output of the bounded integrator is fed through an integral gain $k_i$ 620. The proportional output and the integral output are summed by the processing unit 622, and fed into the power output chain via the magnitude limiter 610. The bounded integrator 616 is reset by the inverter 624 whenever the ice protection control system is switched off.

Disregarding the effect of the change rate limiter 608 and the magnitude limiter 610, the control system implements an approximation of the following control function:

$$o(t) = ki(t) + k_i \int_0^t i(\tau)\,d\tau$$

where i(t) is the input from the temperature probe at time t, o(t) is the heater output at time t, k is the proportional gain, and $k_i$ is the integral gain.

Appropriate values of the parameters k and $k_i$ are selected in accordance with the principles of control theory in order to provide a control system that is stable and relatively responsive but which does not overshoot significantly.

The control system 600 also includes other components such as analogue to digital converters, digital to analogue converters, power amplifiers, calibration filters, and so on which have been omitted for clarity. In the present embodiment, the control loop processing (in particular the PI controller element) is carried out by a digital signal processor (DSP), with the necessary transducers, power amplifiers and switching circuitry provided in hardware. Alternative arrangements, using any appropriate mixture of analogue and digital systems, are of course possible.

In a variant of the above embodiment a derivative controller may also be provided (optionally in place of the proportional and/or integral elements), which can improve the responsiveness of the system to external disturbances. However it may be preferred to omit the derivative controller in order to minimise sensitivity to noise. In another variant, the proportional and/or integral gains can be implemented using adaptive filters, to allow the system to be tuned to provide optimal responsiveness without significant overshoot.

In the control system described above, it is still possible for some overshoot (overheating) to occur. Some refinements can be made in order to reduce the risk of overshoot.

A further embodiment of the control system, providing further overshoot protection, will now be described.

Figure 7:
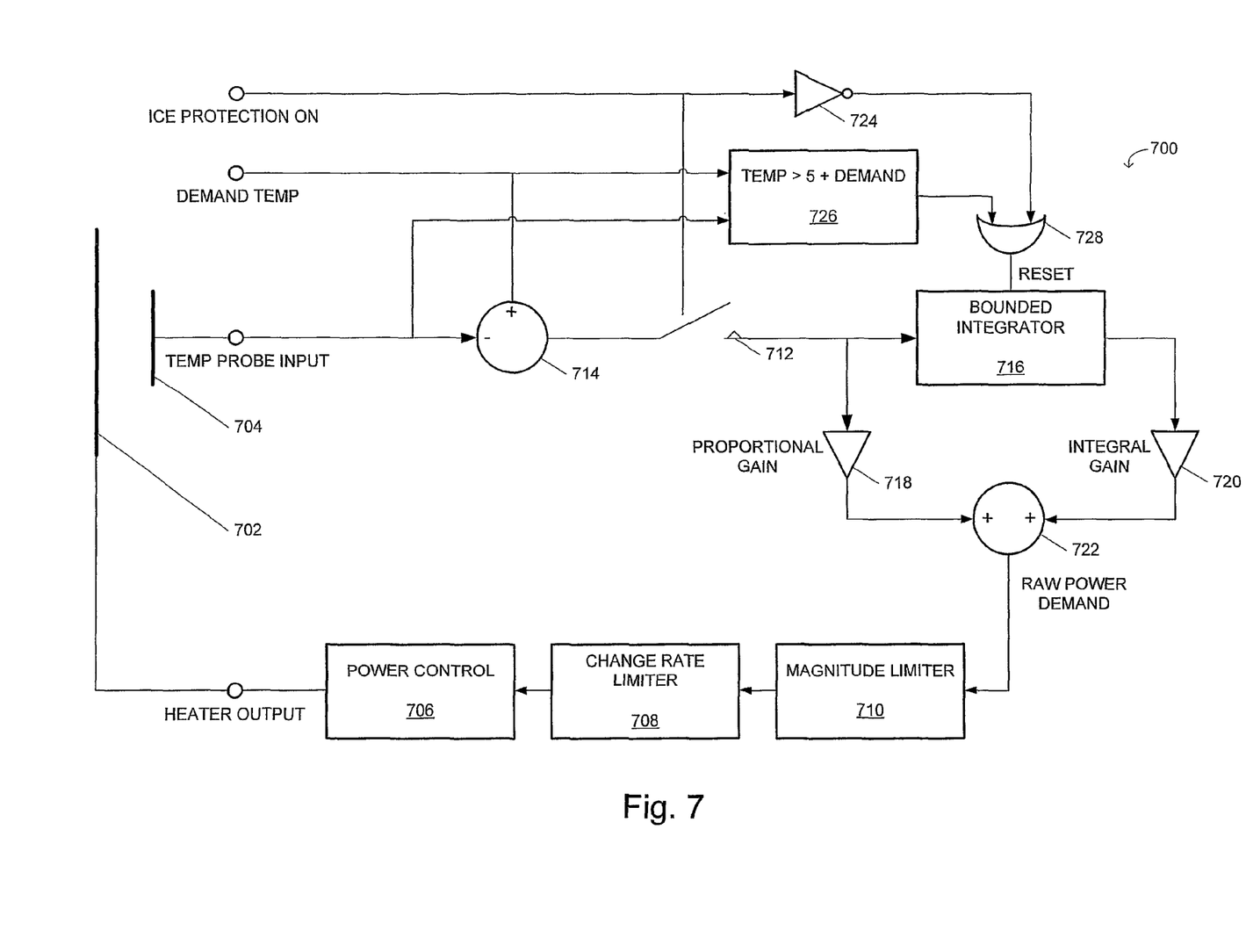
FIG. 7 is a schematic of an alternative temperature control system for use with the ice protection system of FIG. 1.

FIG. 7 is a schematic of an alternative temperature control system for use with the ice protection system of FIG. 1.

As before, the control system 700 provides a heater output to a heater mat 702, and receives an input from the temperature probe 704. The heater mat 702 is driven by a power control unit 706, which is fed via a change rate limiter 708 and a magnitude limiter 710.

When the ice protection system is switched on (via the 'ice protection on' input), the switch 712 again closes to form the control loop, and the temperature probe input is subtracted from the input demand temperature by the processing unit 714 to determine an error signal. The error signal is then fed into a bounded integrator 716 and a proportional gain unit 718. The output of the bounded integrator is fed through an integral gain 720. The proportional output and the integral output are summed by the processing unit 722, and fed into the power output chain via the magnitude limiter 710.

The ice protection enable signal is inverted by the inverter 724 to produce a first reset signal. The demand temperature and the measured temperature are compared by the processing unit 726 to determine whether or not the measured temperature exceeds the demand temperature by more than five degrees centigrade (or any other threshold that is desired to be set). If so, a second reset signal is generated. The two reset signals are fed into the OR gate 728, which has an output connected to the bounded integrator 716. If either reset signal is activated, the bounded integrator is reset. This can reduce the incidence of overshoot errors.

The overall operation of the system will now be described in more detail.

Figure 8:
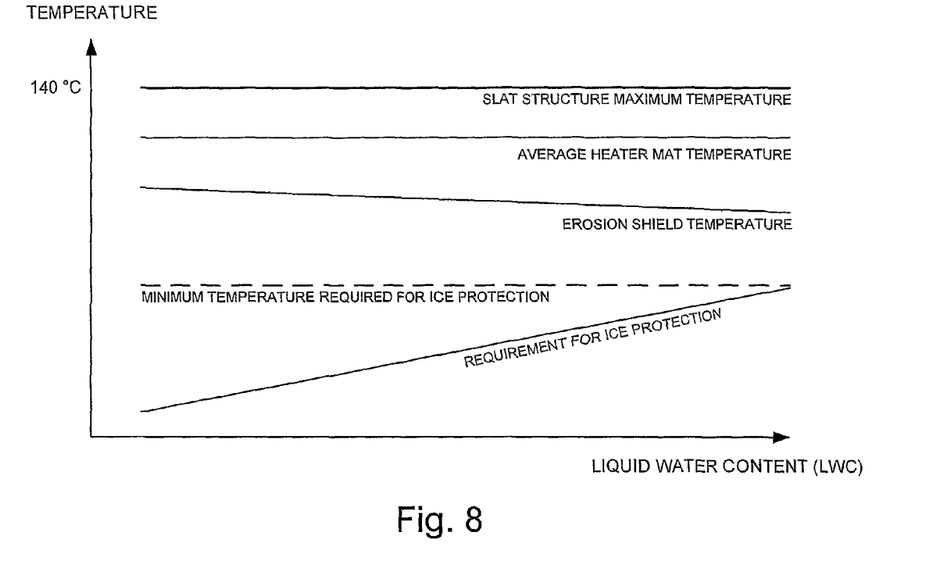
FIG. 8 is a graph illustrating the dependence of various temperature measurements on liquid water content (LWC)

FIG. 8 is a graph illustrating the dependence of various temperature measurements on liquid water content (LWC). The LWC is one measure of the icing conditions that determines how much ice forms and therefore how much power is required to be supplied to remove the ice. The slat structure maximum temperature (approximately 140° C.) is shown on the graph, indicating the point beyond which delamination (structural failure) may be expected to occur. At the bottom of the graph the requirement for ice protection is shown, indicating the erosion shield temperature that is required in order to avoid the formation of ice. As the LWC increases, a higher temperature is required in order to prevent ice formation.

A minimum temperature for ice protection is indicated on the graph, corresponding to the temperature of the erosion shield that is necessary to prevent the formation of ice under the most extreme icing conditions (the highest LWC).

In the present embodiment, the control system described above ensures that the average heater mat temperature is approximately constant, regardless of the icing conditions. The average heater mat temperature is chosen so that there is a suitably large margin of safety between the average heater mat temperature and the slat structure maximum temperature, but also so that the erosion shield temperature (also indicated on the graph) exceeds the minimum temperature required for ice protection by another appropriate safety margin. It can be seen (and is to be expected) that for a constant heater mat temperature, the erosion shield temperature drops with increasing LWC (because of the increasing thermal load on the system).

The appropriate average heater mat temperature (the temperature demand of FIGS. 6 and 7) can be found by experiment and by consideration of the icing conditions likely to be faced for a particular aircraft.

It will be appreciated that the control system described above can supply more energy to the heater mats than may be required for a particular set of icing conditions, but it will also be appreciated that the control system is relatively simple and relatively stable, since it does not depend on any temperature measured at the erosion shield or otherwise distant from the heater mat (which can lead to instability because of the lag caused by thermal capacity between the heater mat and the temperature sensor). Additionally, the control system described above can lead to a relatively constant power demand from the ice protection system, which is in many cases preferable to a rapidly varying and relatively unpredictable power demand.

Figure 9:
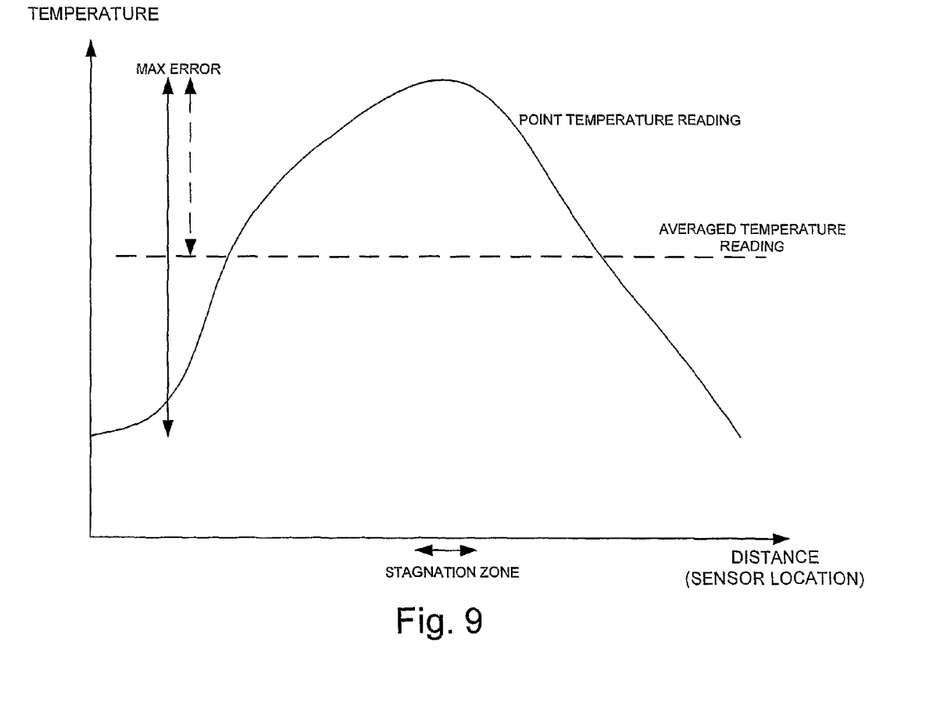
FIG. 9 is a graph illustrating a possible variation in heater mat temperature over distance.

FIG. 9 is a graph illustrating a typical variation in heater mat temperature over distance. The temperature measured by the temperature sensor is plotted against a distance moved along the wing surface either above or below the stagnation zone of the wing (corresponding to the temperature measured by the sensor 314 of FIG. 3 as it is moved up and down around the wing in the same plane as the cross-section of FIG. 3).

By way of further background, a heating mat on the leading edge of an aircraft wing is subject to both variable water impingement and variable flow rates over the surface. This means that the effective cooling coefficient is also variable. The cooling coefficient will tend to be lowest in the region of the flow stagnation zone. Normally the stagnation zone is heated with the highest power density. These two factors mean that the stagnation zone is usually always the hottest.

In a conventional aircraft, the stagnation zone was found to move by approximately 2 inches with variation of angle of attack of the aircraft. In FIG. 9 a typical point temperature reading is shown in this vicinity. It can be seen that by averaging the temperature over this region (using an averaging sensor), the error in estimation of peak temperature can be approximately halved.

An averaging temperature sensor can be constructed by using a point temperature sensor attached to a high thermal conductivity strip (such as a 2 inch length of copper, for example) in a low conductivity 'wrapper'. An alternative is to use a distributed or long resistive sensor. Currently the latter is preferred.

The ice protection system of a large aircraft can be constructed from over 100 separate heater mats, and it can be cumbersome and expensive to provide a temperature sensor and a control system for each heater mat. The present embodiment addresses this issue by driving multiple heater mats from a single temperature sensor and control system, as will now be described with reference to FIGS. 10 to 13.

Figure 10:
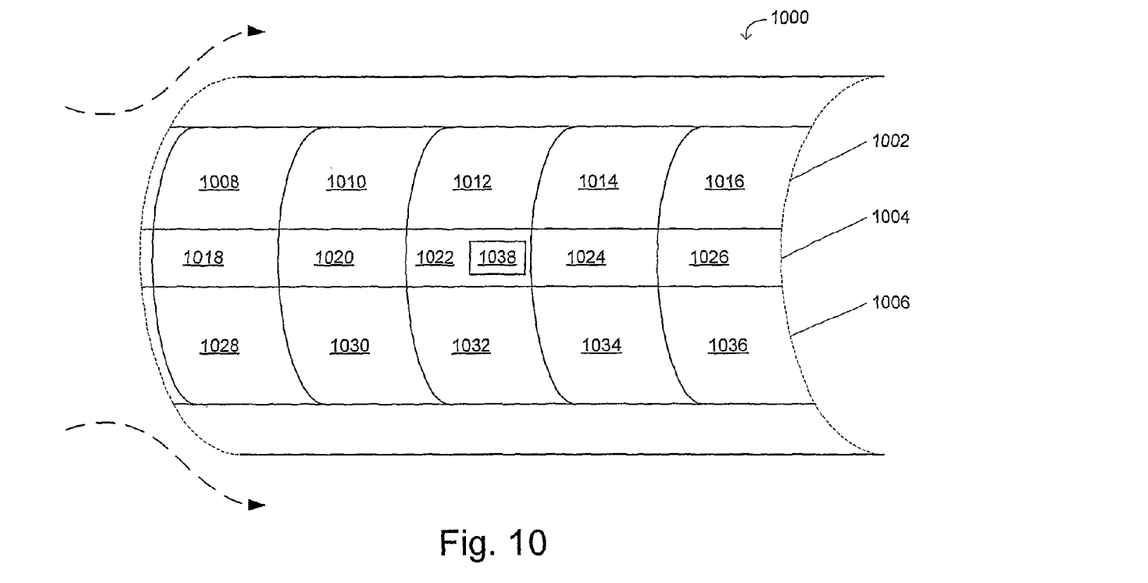
FIG. 10 is a front-on view of the wing section of FIG. 3 showing the placement of individual heater mats and a temperature sensor.

FIG. 10 is a front-on view of the wing section of FIG. 3 showing the placement of individual heater mats and a temperature sensor.

The wing structure 1000 includes a first de-icing strip 1002, an anti-icing parting strip 1004 arranged approximately around the stagnation zone of the wing, and a second de-icing strip 1006. The de-icing strips 1002, 1006 are arranged so as to cover the areas of the wing where water run-back from the parting strip 1004 is likely to refreeze. The first de-icing strip 1002 comprises individual heater mats 1008, 1010, 1012, 1014, 1016. The parting strip 1004 comprises individual heater mats 1018, 1020, 1022, 1024, 1026. The second de-icing strip 1006 comprises individual heater mats 1028, 1030, 1032, 1034, 1036. A temperature sensor 1038 is provided behind the central mat 1022.

In the present embodiment all of the individual heater mats are driven from the single temperature sensor 1038. As noted, this can simplify construction and reduce cost. However, the thermal loading on the wing (and thus on each heater mat) not only varies with icing conditions but also with the position on the wing and the current flying conditions (angle of attack, wind speed, and so on). There are in fact many factors influencing the thermal load which cannot all effectively be measured and accounted for. However, another approach can be taken to address the varying thermal load, as will now be described.

Figure 11:
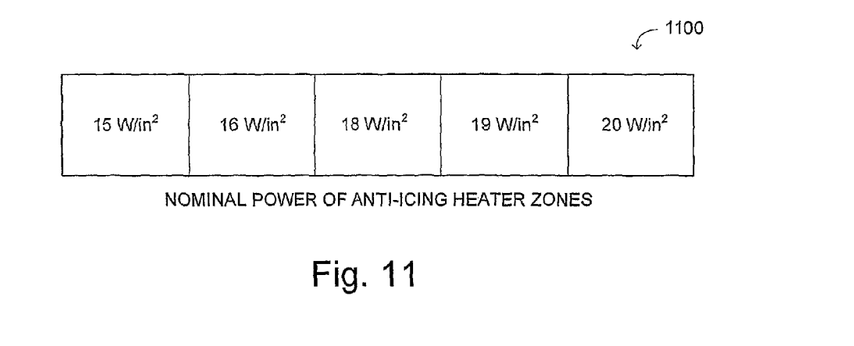
FIG. 11 is an illustration of the nominal power of different anti-icing heater zones.

FIG. 11 is an illustration of the nominal power of different anti-icing heater zones (with reference to the parting strip 1004 of FIG. 10).

The parting strip 1100 contains five separate heater mats. The nominal power of each of the heater zones that is required for effective anti-icing performance is determined during testing under a typical icing conditions (in a wind tunnel, for example). Some typical values of nominal power are illustrated in the figure.

Figure 12:
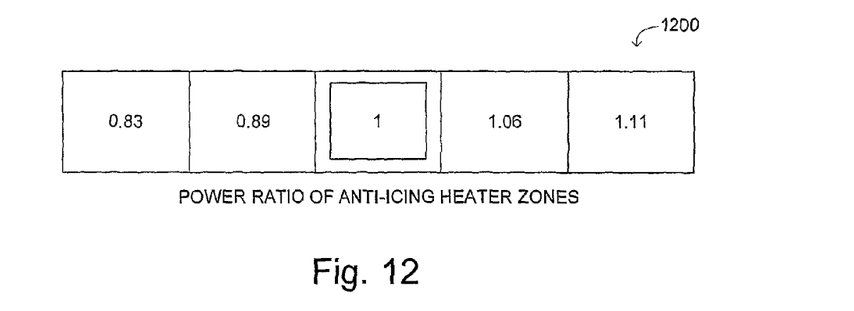
FIG. 12 is an illustration of the ratios of the nominal powers of FIG. 11.

FIG. 12 is an illustration of the ratios of the nominal powers of FIG. 11.

The parting strip 1200 is again shown, and the relative power ratios of the anti-icing zones (relative to the central zone in which the temperature sensor is located) are shown.

It was found that the relative power ratio required for effective anti-icing (and also de-icing, as appropriate) did not vary significantly during variations in icing conditions. Correspondingly, it was found that heater zones without temperature sensors could effectively be slaved off the control output for a heater zone with a temperature sensor essentially by multiplying by the power ratio of nominal power consumption.

In other embodiments the power ratio can be defined as a more complicated function, for example varying in dependence on a measured property of the icing conditions, in order to more accurately model the relative power requirements under different conditions.

An example of a control system for the slaved heater zones will now be described.

Figure 13:
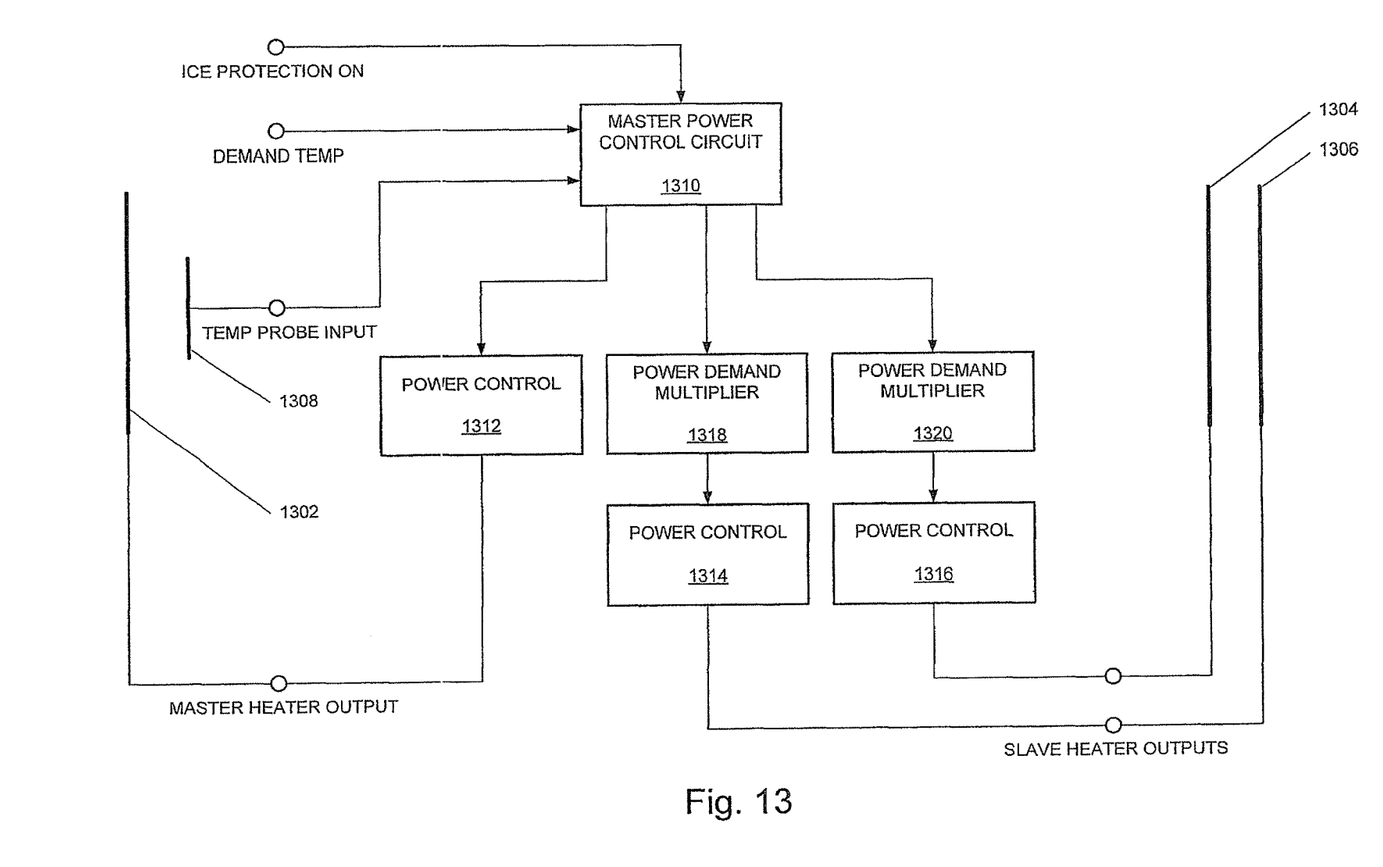
FIG. 13 is a schematic of a temperature control system for use with the heater zones of FIG. 10.

FIG. 13 is a schematic of a temperature control system for use with the heater zones of FIG. 10.

Three heater mats 1302, 1304, 1306 are shown. The first heater mat 1302 is of the type shown in FIGS. 6 and 7 with an associated temperature probe 1308. The other heater mats 1304, 1306 are slave devices as discussed above (such as the heater mats 1020, 1024 of FIG. 10).

A master power control circuit 1310 is provided, of the type shown in FIG. 6 or 7 (but excluding the power control 606, 706). The master control circuit 1310 takes the temperature probe 604 input, a demand temperature, and an ice protection enable signal as an input, and generates a power demand using proportional/integral (PI) control as described above. The heater mats are driven using a power control unit 1312, 1314, 1316 as before. However, the power demand of the slave mats 1304, 1306 are filtered through power demand multipliers 1318, 1320, which effectively multiply the power demand by the appropriate power ratio discussed above in relation to FIG. 12.

The control system can be scaled up as necessary and refinements to the control scheme can be made as discussed above.

A surface-mounted design of heater mat has been described above, for application to composite material structures. It will be appreciated that the heater mats and associated temperature probes can also be embedded into the wing (or other) structure, or attached to the interior of a (hollow) wing structure. Normally external or embedded heater mats may be more suitable for composite material wing structures. The design can also be applied to metal structures, in which case external or interior heater mats may be more suitable. The design can of course be implemented for other structural materials and designs.

An ice protection system has been described above with particular reference to preventing ice build-up on the aerodynamic surfaces of an aircraft. However, it will be appreciated that the ice protection can find application in many other fields, including both mobile structures (including vehicles of various kinds) and static structures. For example, the ice protection system could be use on land- or water-based vehicles (such as cars, buses, boats, and various military vehicles) as well as other air-based vehicles such as helicopters, spacecraft and the like. The system can also be used on buildings and other miscellaneous constructions including antennae and cabling, which may be particularly sensitive to a build-up of ice. In such applications, ice formation may occur due to prevailing environmental conditions (cold climate and/or high winds) and/or because of the movement of a vehicle (creating high effective wind chill, for example).

It will be appreciated that the ice protection system described above can also (where applicable) be adapted for use in any environment or application in which a surface or other part of a structure or the environment is required to be kept above, a particular temperature (including situations in which no ice is present, for example to avoid condensation rather than ice formation). The system is suitable in particular in situations where a range of conditions prevail that cause a variable amount of heat loss in the structure or environment.

Further modifications lying within the spirit and scope of the present invention will be apparent to a skilled person in the art.

The invention claimed is:

1. An ice protection system for a structure having at least one surface to be protected from a range of icing conditions, the ice protection system comprising:
   at least one heater device, arranged in thermal contact with said at least one surface;
   at least one temperature sensor for outputting at least one temperature signal, said at least one sensor being in thermal contact with at least one said heater device and said temperature signal being indicative of a temperature of one or more heater devices; and
   a control system for controlling the heat output of said at least one heater device, wherein said at least one heater device is arranged between said at least one temperature sensor and said at least one surface to be protected, said at least one heater device being arranged to dissipate heat in one direction through said at least one surface and being arranged to dissipate heat through the structure in a direction away from the at least one surface, said at least one temperature sensor being arranged between said at least one heater device and said structure, and the ice protection system being arranged such that a first thermal resistance between said at least one heater device and said structure is smaller than a second thermal resistance between said at least one heater device and said at least one surface, wherein the control system comprises a processing unit configured to output at least one estimate of the temperature at said at least one surface, the processing unit calculating said at least one estimate of the temperature using at least one estimate of the heat output by said at least one heater device, said at least one temperature signal, and at least one estimate of the thermal resistance between said at least one heater device and said at least one surface, wherein the control system is operable to control the heat output of said at least one heater device using at least one of said at least one temperature signal and/or said at least one estimate of the temperature at said at least one surface, and wherein the control system is operable to control the heat output of said at least one heater device to maintain the temperature of the, or each, heater device at a substantially constant temperature.

2. An ice protection system according to claim 1 for use with an aircraft, wherein said at least one substantially constant temperature is sufficient to prevent ice accumulation on said at least one surface during icing conditions to which the aircraft is expected to be subjected.

3. An ice protection system according to claim 1, wherein the control system is operable to maintain the temperature of each of said at least one heater device at a respective substantially constant temperature in order to enable different heater devices to operate at different temperatures.

4. An ice protection system according to claim 1, wherein the control system is operable to control the heat output of said at least one heater device to maintain a temperature at said at least one surface at or above a minimum temperature.

5. An ice protection system according to claim 1, having a first thermal resistance between said at least one temperature sensor and said at least one heater device and a second thermal resistance between said at least one temperature sensor and said at least one surface to be protected, and wherein the first thermal resistance is smaller than the second thermal resistance.

6. An ice protection system according to claim 1, having a first thermal capacity between said at least one temperature sensor and said at least one heater device and a second thermal capacity between said at least one surface and said at least one heater device to be protected, and wherein the first thermal capacity is smaller than the second thermal capacity.

7. An ice protection system according to claim 1, wherein said at least one temperature sensor is separated from said at least one heater device by a layer of thermal insulation.

8. An ice protection system according to claim 1, wherein said at least one temperature sensor is operable to provide an averaged temperature reading.

9. An ice protection system according to claim 8, wherein said at least one temperature sensor comprises at least one point temperature sensor and at least one high thermal conductivity strip to which said at least one point temperature sensor is attached.

10. An ice protection system according to claim 8, wherein said at least one temperature sensor comprises at least one distributed or long resistive temperature sensor.

11. An ice protection system according to claim 1, wherein said at least one heater device includes at least one anti-icing strip.

12. An ice protection system according to claim 1, wherein said at least one heater device includes at least one ice breaker strip.

13. An ice protection system according to claim 12, wherein the control system is operable to switch said at least one ice breaker strip on and off in accordance with a de-icing schedule.

14. An ice protection system according to claim 1, wherein the control system comprises at least one power controller operable to supply variable amounts of power to said at least one heater device in dependence on control signals received from the control system.

15. An ice protection system according to claim 1, wherein the control system is operable to receive a signal indicative of a demand heater device temperature, and to maintain the temperature of said at least one heater device in dependence on the demand heater device temperature.

16. An ice protection system according to claim 1, wherein the control system is operable to determine a target heat output for each of said at least one heater device, and to control said at least one heater device using the target heat output.

17. An ice protection system according to claim 16, wherein:
said at least one heater device includes at least one heater device having an associated temperature sensor and at least one heater device not having an associated temperature sensor; and
the control system is operable to determine the target heat output for said at least one heater device not having an associated temperature sensor as a function of the target heat output of a heater device having an associated temperature sensor.

18. An ice protection system according to claim 1, wherein the control system includes at least one feedback controller for controlling the heat output of each heater device using said at least one temperature signal.

19. An ice protection system according to claim 1, wherein the control system includes at least one feedforward controller for controlling the heat output of each heater device using at least one signal indicative of the icing conditions.

20. A structure exposable to icing conditions, comprising:
at least one member having at least one surface to be protected from a range of icing conditions; and
an ice protection system according to claim 1.

21. A structure according to claim 20, wherein the structure includes laminate material.

22. A method of installing an ice protection system for a structure having at least one surface to be protected from a range of icing conditions, the method comprising:
arranging at least one heater device in thermal contact with said at least one surface;
arranging at least one temperature sensor in thermal contact with at least one said heater device, said at least one temperature sensor being operable to output at least one temperature signal, said temperature signal being indicative of a temperature of one or more heater devices; and installing a control system for controlling the heat output of said at least one heater device, wherein said at least one heater device is arranged between said at least one temperature sensor and said at least one surface to be protected, said at least one heater device being arranged to dissipate heat in one direction through said at least one surface and being arranged to dissipate heat through the structure in a direction away from the at least one surface, said at least one temperature sensor being arranged between said at least one heater device and said structure, and the ice protection system being arranged such that a first thermal resistance between said at least one heater device and said structure is smaller than a second thermal resistance between said at least one heater device and said at least one surface, wherein the control system comprises a processing unit configured to output at least one estimate of the temperature at said at least one surface, the processing unit calculating said at least one estimate of the temperature using at least one estimate of the heat output by said at least one heater device, said at least one temperature signal, and at least one estimate of the thermal resistance between said at least one heater device and said at least one surface, wherein the control system is operable to control the heat output of said at least one heater device using at least one of said at least one temperature signal and said at least one estimate of the temperature at said at least one surface, and wherein the control system is operable to control the heat output of said at least one heater device to maintain the temperature of said at least one heater device at a substantially constant temperature.

23. An ice protection system for a structure having at least one surface to be protected from a range of icing conditions, the ice protection system comprising:

at least one heater device, arranged in thermal contact with said at least one surface;

at least one temperature sensor for outputting at least one temperature signal, said at least one sensor being in thermal contact with at least one said heater device and said temperature signal being indicative of a temperature of one or more heater devices; and a control system for controlling the heat output of said at least one heater device, wherein said at least one heater device is arranged between said at least one temperature sensor and said at least one surface to be protected, said at least one heater device being arranged to dissipate heat in one direction through said at least one surface and being arranged to dissipate heat through the structure in a direction away from the at least one surface, said at least one temperature sensor being arranged between said at least one heater device and said structure, and the ice protection system being arranged such that a first thermal resistance between said at least one heater device and said structure is smaller than a second thermal resistance between said at least one heater device and said at least one surface, and wherein the control system is operable to control the heat output of said at least one heater device to maintain the temperature of the or each heater device at a substantially constant temperature using said at least one temperature signal.

24. An ice protection system according to claim 23, having a first thermal resistance between said at least one temperature sensor and said at least one heater device, and a second thermal resistance between said at least one temperature sensor and said at least one surface to be protected, and wherein the first thermal resistance is smaller than the second thermal resistance.

25. An ice protection system according to claim 23, having a first thermal capacity between said at least one temperature sensor and said at least one heater device, and a second thermal capacity between said at least one surface and said at least one heater device to be protected, and wherein the first thermal capacity is smaller than the second thermal capacity.

26. An ice protection system according to claim 23, wherein the control system is operable to receive a signal indicative of a demand heater device temperature, and to maintain the temperature of said at least one heater device in dependence on the demand heater device temperature.

27. An ice protection system according to claim 23, wherein:

said at least one heater device includes at least one heater device having an associated temperature sensor and at least one heater device not having an associated temperature sensor; and the control system is operable to determine the target heat output for said at least one heater device not having an associated temperature sensor as a function of the target heat output of a heater device having an associated temperature sensor.

* * * * *

UNITED STATES PATENT AND TRADEMARK OFFICE
CERTIFICATE OF CORRECTION

PATENT NO. : 8,602,359 B2  Page 1 of 1
APPLICATION NO. : 12/293405
DATED : December 10, 2013
INVENTOR(S) : Ian McGregor Stothers It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1131 days.

Signed and Sealed this

Twenty-second Day of September, 2015

Michelle K. Lee
*Director of the United States Patent and Trademark Office*